(12) United States Patent
Zeltser et al.

(10) Patent No.: US 8,139,321 B2
(45) Date of Patent: Mar. 20, 2012

(54) PERPENDICULAR MAGNETIC RECORDING WRITE HEAD WITH IMPROVED LAMINATED MAIN POLE

(75) Inventors: Alexander M. Zeltser, San Jose, CA (US); Stefan Maat, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 163 days.

(21) Appl. No.: 12/759,508

(22) Filed: Apr. 13, 2010

(65) Prior Publication Data

US 2011/0249365 A1 Oct. 13, 2011

(51) Int. Cl.
*G11B 5/31* (2006.01)
(52) U.S. Cl. .................................. 360/125.12
(58) Field of Classification Search ............. 360/125.12
See application file for complete search history.

(56) References Cited

U.S. PATENT DOCUMENTS

| | | | |
|---|---|---|---|
| 6,197,439 B1 | 3/2001 | Parkin et al. | |
| 6,791,796 B2 | 9/2004 | Shukh et al. | |
| 7,057,853 B2 * | 6/2006 | Okada et al. | 360/125.12 |
| 7,064,924 B2 | 6/2006 | Ju et al. | |
| 7,159,302 B2 | 1/2007 | Feldbaum et al. | |
| 7,280,314 B2 * | 10/2007 | Gill et al. | 360/125.12 |
| 7,289,297 B1 * | 10/2007 | Ewasko et al. | 360/125.12 |
| 7,436,629 B2 * | 10/2008 | Freitag et al. | 360/125.12 |
| 7,609,478 B2 * | 10/2009 | Han et al. | 360/125.12 |
| 7,656,611 B2 | 2/2010 | Liu et al. | |
| 7,777,989 B2 * | 8/2010 | Sun et al. | 360/125.12 |
| 7,911,737 B1 * | 3/2011 | Jiang et al. | 360/125.12 |
| 8,004,794 B2 * | 8/2011 | Zhou et al. | 360/125.31 |
| 2009/0009907 A1 * | 1/2009 | Zhang et al. | 360/125.12 |
| 2009/0073608 A1 | 3/2009 | Ookawa et al. | |

* cited by examiner

*Primary Examiner* — Mark Blouin
(74) *Attorney, Agent, or Firm* — Thomas R. Berthold

(57) ABSTRACT

A perpendicular magnetic recording write head has an improved antiferromagnetically-coupled laminated main pole (MP) formed on a substrate. The MP has two ferromagnetic multilayers, each comprising at least one FeCo/NiFe/FeCo ferromagnetic trilayer, antiferromagnetically coupled across an antiferromagnetically coupling (AFC) film consisting essentially of ruthenium (Ru). The MP has a NiFe layer directly above the AFC film, on the side of the AFC film opposite the side facing the substrate, and in contact with the Ru AFC film and the lower FeCo layer of the upper multilayer. There is no NiFe layer directly below the Ru AFC film so the side of the AFC film facing the substrate is in direct contact with the upper FeCo layer of the lower multilayer.

20 Claims, 6 Drawing Sheets

PERPENDICULAR MAGNETIC RECORDING WRITE HEAD WITH IMPROVED LAMINATED MAIN POLE

BACKGROUND OF THE INVENTION

1. Field of the Invention

This invention relates generally to perpendicular magnetic recording systems, and more particularly to perpendicular magnetic recording write heads for use in magnetic recording disk drives.

2. Description of the Related Art

In a perpendicular magnetic recording system like a magnetic recording hard disk drive, the recorded bits are stored in a perpendicular or out-of-plane orientation in the recording layer. The recording or write head in perpendicular magnetic recording disk drives includes a write pole comprising a shaped pole and a main pole for writing to the recording layer, and one or more return poles for return of magnetic flux from the recording layer.

The main pole is typically formed of high moment magnetic materials, the most common example being iron-cobalt (FeCo) alloys. One of the problems with the high-moment main pole is "erase-after-write", i.e., the undesirable erasure of information after writing. This is due to the high-moment main pole having a high remanent magnetization or remanence, i.e., the magnetization that remains after the magnetic field is removed. It is known that remanence can be reduced by forming the main pole as a lamination of multiple ferromagnetic layers. One common lamination approach is the use of an antiferromagnetically coupling (AFC) film between two FeCo layers. The two antiferromagnetically coupled FeCo layers have antiparallel magnetizations that substantially cancel each other in the absence of a magnetic field, thus resulting in low remanence.

In addition to low remanence, the main pole should also have high magnetic permeability for quick response. Permeability ($\mu$) is defined as the ratio $Bs/H_{95}$, where $Bs$ is the saturation magnetization and $H_{95}$ is the magnetic field required for 95% saturation. However, a disadvantage of the laminated main pole with antiferromagnetically coupled FeCo layers is increased saturation field, and thus decreased permeability.

Antiferromagnetically-coupled laminated main poles have been described with a Ru AFC film between two FeCo layers (U.S. Pat. No. 7,057,853), a Ru AFC film between two NiFe layers (U.S. Pat. No. 7,159,302 and U.S. Pat. No. 7,436,629) and a Cr AFC film between two FeCo layers (U.S. Pat. No. 7,656,611 B2). U.S. Pat. No. 7,064,924 describes an antiferromagnetically-coupled laminated main pole with very thin (2-4 Å) NiFe films between a Ru AFC film and the FeCo layers for adjusting the coupling strength across the AFC film.

What is needed is a perpendicular magnetic recording write head that has an improved laminated main pole with both low remanence and high permeability.

SUMMARY OF THE INVENTION

The invention relates to a perpendicular magnetic recording write head with an improved antiferromagnetically-coupled laminated main pole (MP). The MP has two ferromagnetic multilayers, each comprising at least one FeCo/NiFe/FeCo ferromagnetic trilayer, antiferromagnetically coupled across an antiferromagnetically coupling (AFC) film consisting essentially of ruthenium (Ru). The lower multilayer is between the substrate on which the laminated MP is formed and the AFC film, and the upper multilayer is above the AFC film. The MP has a NiFe layer directly above the AFC film, i.e., on the side of the AFC film opposite the side facing the substrate, and in contact with the Ru AFC film and the lower FeCo layer of the upper multilayer. However, there is no NiFe layer directly below the Ru AFC film so the side of the AFC film facing the substrate is in direct contact with the upper FeCo layer of the lower multilayer. The combination of the Ru AFC film, the AFC-adjacent NiFe layer above the Ru AFC film, and the absence of a NiFe layer directly below the Ru AFC film results in a MP with substantially reduced remanence and substantially increased permeability over the prior art.

For a fuller understanding of the nature and advantages of the present invention, reference should be made to the following detailed description taken together with the accompanying figures.

DETAILED DESCRIPTION OF THE INVENTION

Figure 1:
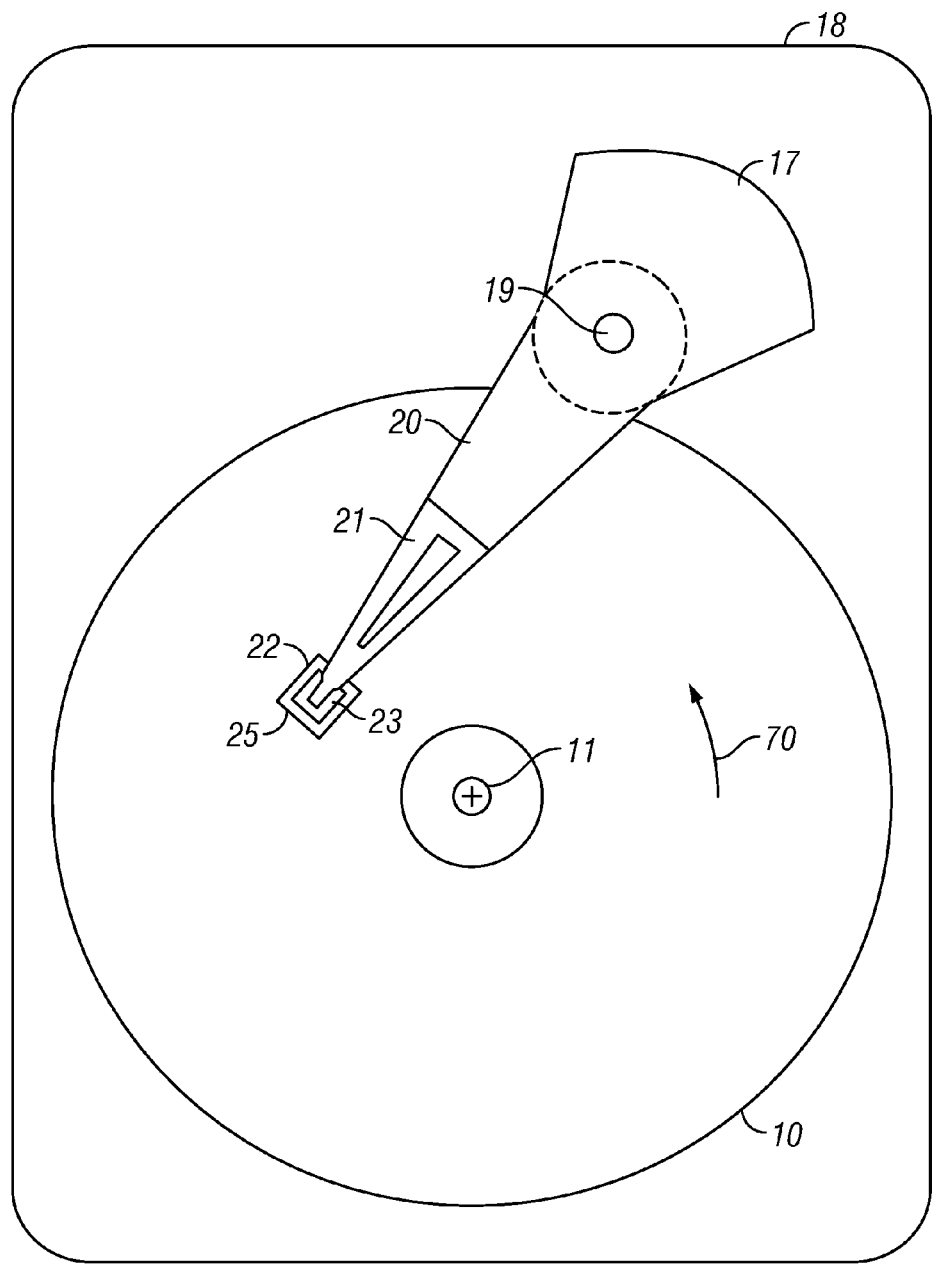
FIG. 1 is a schematic top view of a conventional magnetic recording hard disk drive with the cover removed.

FIG. 1 is a block diagram of a conventional magnetic recording hard disk drive with the cover removed. The disk drive includes a magnetic recording disk 10 and a rotary voice coil motor (VCM) actuator 17 supported on a disk drive housing or base 18. The disk 10 has a magnetic recording layer (RL) with generally concentric data tracks. The disk 10 has a center of rotation 11 and is rotated in direction 70 by a spindle motor (not shown) mounted to base 18. The actuator 17 pivots about axis 19 and includes a rigid actuator arm 20. A generally flexible suspension 21 includes a flexure element 23 and is attached to the end of arm 20. A head carrier or air-bearing slider 22 is attached to the flexure 23. A magnetic recording read/write head (not shown) is formed on the trailing surface 25 of slider 22. The flexure 23 and suspension 20 enable the slider to "pitch" and "roll" on an air-bearing generated by the rotating disk 10. Typically, there are multiple disks stacked on a hub that is rotated by the spindle motor, with a separate slider and read/write head associated with each disk surface.

Figure 2A:
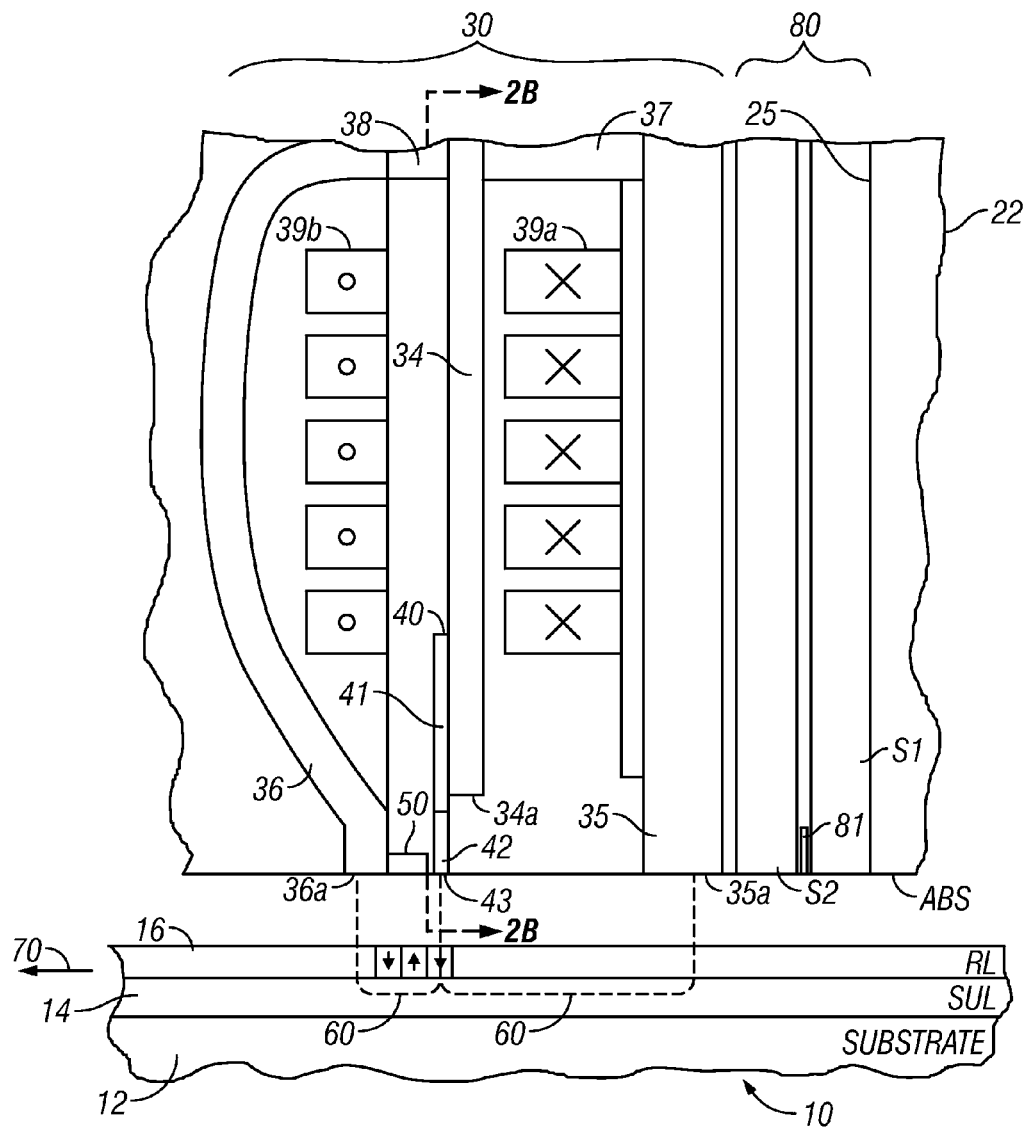
FIG. 2A is a side sectional view of a prior art perpendicular magnetic recording system showing a read head, a write head, and a recording medium taken through a plane parallel to a data track.

FIG. 2A is a side sectional view of a portion of the slider 22 showing a read head 80, a write head 30, and the recording medium (disk 10) with RL 16 taken through a plane parallel to a data track. As shown in FIG. 2A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a magnetoresistive (MR) read head 80 and a single pole type of recording or write head 30 that are shown in a section taken through a plane parallel with a data track on RL 16. The MR read head 80 includes the MR sensor 81 located between MR shields S1, S2.

The write head 30 includes a yoke made up of the shaped pole 34, also referred to as P2, a first flux return pole 35, also referred to as P1, a yoke stud 37 connecting the shaped pole 34 and first return pole 35, a second flux return pole 36, also referred to as P3, a yoke stud 38 connecting the shaped pole 34 and second flux return pole 36, and a thin film coil 39*a*, 39*b* shown in section around shaped pole 34. The coil 39*a*, 39*b* is depicted as a helical coil wrapped around shaped pole 34, but the coil may also be a well-known "pancake" coil wherein the coil is wrapped around the yoke and the coil segments lie in substantially the same plane. A flared main-pole (MP) 40 is formed over the shaped pole 34 and has a flared portion 41 and a pole tip 42 with an end 43 that faces the outer surface of disk 10. Write current through coil 39*a*, 39*b* induces a magnetic field (shown by dashed line 60) from the MP 40 that passes through the RL 16 to write to the RL 16 by magnetizing the region of the RL 16 beneath the MP 40. The magnetic field 60 is directed from the RL 16 through the flux return path provided by the SUL 14, and back to the flux return poles 35, 36. The read head 80 and write head 30 are formed as a series of films deposited on the trailing surface 25 of slider 22. Slider 22 has an air-bearing surface (ABS) that faces the disk 10. The pole tip end 43 is located substantially at the ABS, and the first and second return poles, 35, 36 have ends 35*a*, 36*a*, respectively, that are located substantially at the ABS and thus generally coplanar with pole tip end 43. The shaped pole 34, on which MP 40 is formed, has an end 34*a* that is recessed from the ABS. In FIG. 2A the disk 10 moves past the recording head in the direction indicated by arrow 70. The RL 16 is illustrated with perpendicularly recorded or magnetized regions, with adjacent regions having opposite magnetization directions, as represented by the arrows. The magnetic transitions between adjacent oppositely directed magnetized regions are detectable by the MR sensor 81 as the recorded bits. FIG. 2A also illustrates an optional trailing shield (TS) 50 that forms part of a "wraparound" shield that is described in more detail in FIGS. 2B-2C.

Figure 2B:
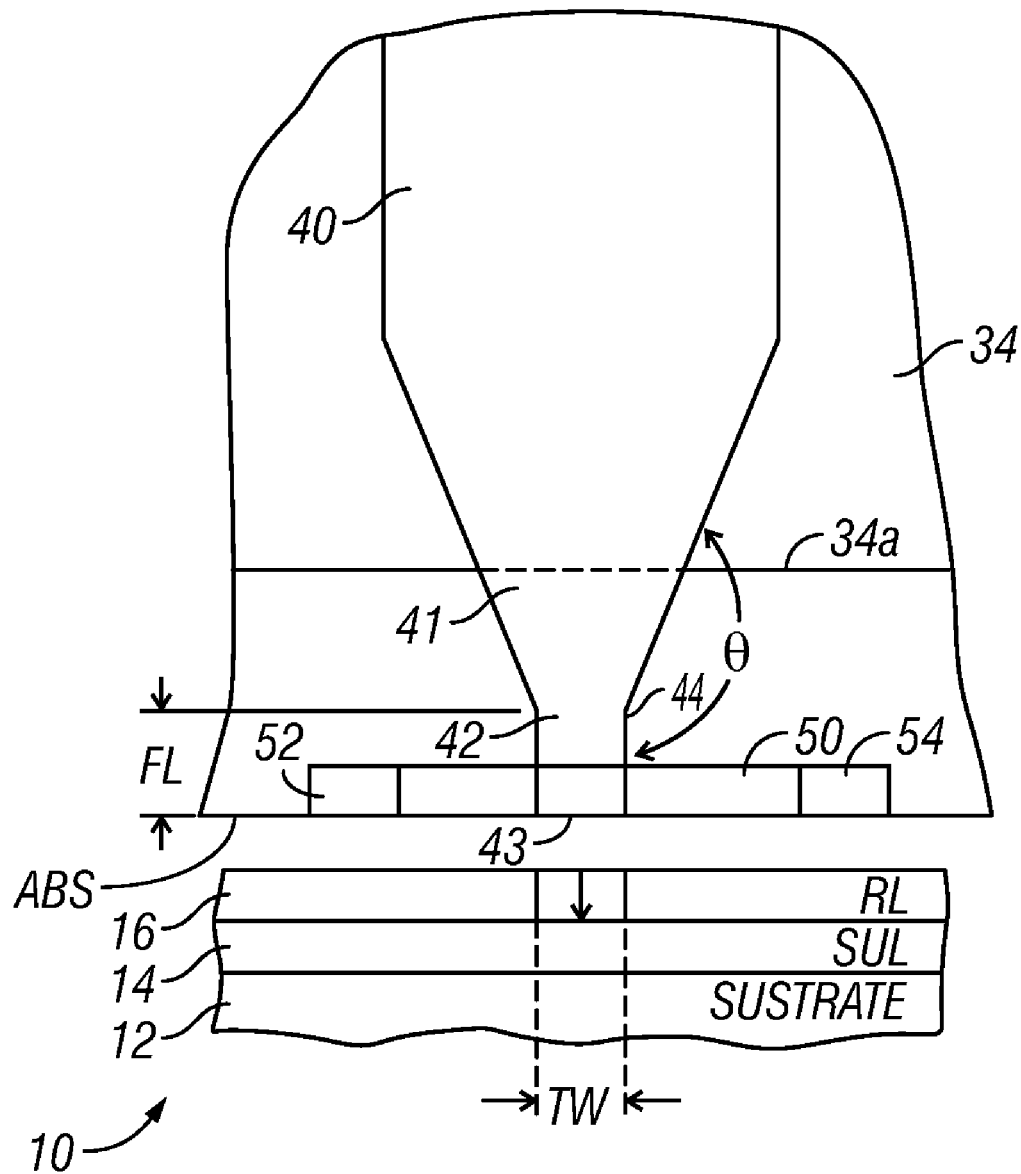
FIG. 2B is a view in the direction 2B-2B of FIG. 2A and illustrates the width of the main pole (MP) to substantially define the trackwidth (TW) of the data recorded in the recording layer (RL).

FIG. 2B is a view in the direction 2B-2B of FIG. 2A. FIG. 2B shows a shaped pole 34 which serves as the substrate for the MP 40. Shaped pole 34 has its end 34*a* recessed from the ABS, and better illustrates the flare region 41 of flared MP 40. The region between the MP tip 42 and the flare portion 41 is called the flare point 44. The flare point 44 of the MP 40 is sometimes referred to as the "choke" point because it is the point where the flux density is highest and where the MP 40 saturates. The MP tip 42 has a "height" from end 43 to flare point 44 called the flare length (FL). As shown in FIG. 2B, the two side walls of MP tip 42 define its width in the cross-track direction, which substantially defines the trackwidth (TW) of the data recorded in the RL 16. The region of the MP 40 above the flare region 41 is substantially wider than MP tip 42 below the flare region 41 and the flare point 44 is the transition point where the MP 40 begins to widen with distance from the ABS. The angle $\theta$ in FIG. 2B is called the flare angle and is between 90 and 180 degrees, typically between about 120 and 150 degrees. FIG. 2B also illustrates optional side shields 52, 54 that form part of an optional wraparound shield that generally surrounds the MP tip 42.

Figure 2C:
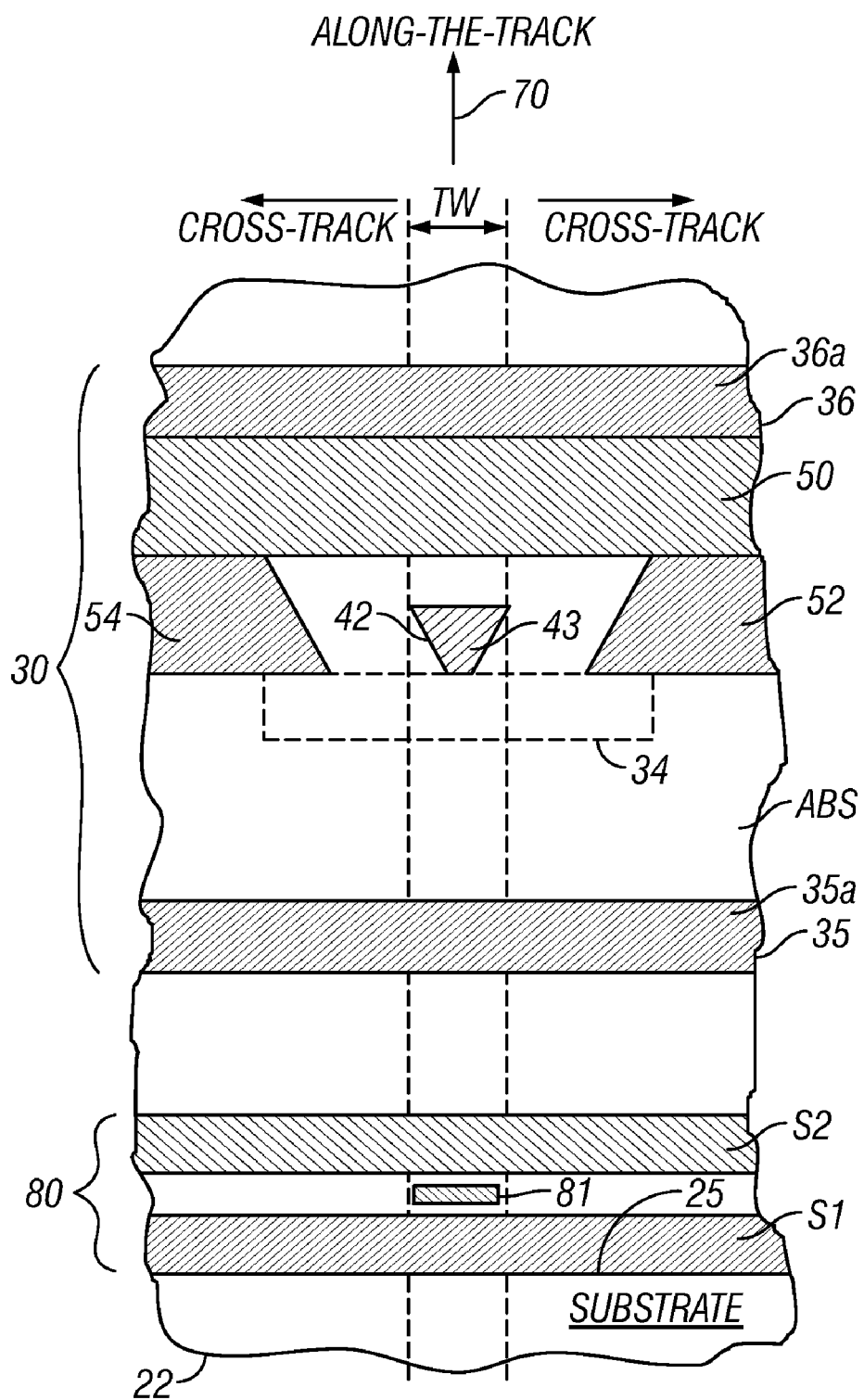
FIG. 2C is a view from the air-bearing surface (ABS) of the prior art write head in FIG. 2A and shows a wraparound shield substantially surrounding the main pole tip and connected to the return pole.

FIG. 2C illustrates the write head 30 as seen from the disk 10. The ABS is the recording-layer-facing surface of the slider 22 that faces the medium 10 and is shown in FIG. 2C without the thin protective overcoat typically present in an actual slider. The recording-layer-facing surface shall mean the surface of the slider or head carrier that is covered with a thin protective overcoat, the actual outer surface of the head carrier if there is no overcoat, or the outer surface of the overcoat. The phrase "substantially at the recording-layer-facing surface" shall mean actually at the surface or slightly recessed from the surface. The disk 10 moves relative to the write head 30 in the direction 70, which is called the along-the-track direction. The dashed lines in FIG. 2C represent the sides of a data track. The width of the end 43 of main pole tip 42 substantially defines the track-width (TW) of the data tracks in the RL 16. The shaped pole 34 is shown with dashed lines because it is recessed from the ABS. The direction perpendicular to direction 70 and parallel to the plane of the ABS is called the cross-track direction.

The wraparound shield that includes side shields 52, 54 and TS 50 is described in detail as a shield for a conventional perpendicular recording head in U.S. Pat. No. 7,002,775 B2 assigned to the same assignee as this application. The shields 50, 52, 54 all have ends substantially at the recording-layer-facing surface. The shields 50, 52, 54 are typically connected to one another and substantially surround the MP tip 42 to from a "wraparound" shield. The TS 50 and side shields 52, 54 are separated from MP tip 42 by nonmagnetic gap material, typically alumina. The wraparound shield with shields 50, 52, 54 separated from the MP tip 42 by nonmagnetic gap material alters the angle of the write field and improves the write field gradient at the point of writing, and also shields the writing field at regions of the RL away from the track being written. The wraparound shield is shown as being connected to the return pole 36 but it may also be a "floating" shield, meaning that it is not connected to either the return pole 36 or other portions of the yoke by flux-conducting material. In other variations of the write head 30, instead of a wraparound shield only a TS without side shields may be used. The TS may be either "floating" or connected to return pole 36. A perpendicular magnetic recording write head with a TS and a process for making it is described in pending application Ser. No. 11/090,456 filed Mar. 25, 2005, published as US2006/0215314 A1, and assigned to the same assignee as this application. The yoke and shields of write head 30 are formed of soft ferromagnetic material, such as alloys of NiFe, CoFe and NiFeCo that are typically formed by electroplating. The shaped pole 34 is formed of a high-moment material, such as a high-moment FeCo alloy.

FIG. 2C also illustrates the magnetoresistive (MR) read head 80 that includes the MR sensor 81 located between MR shields S1, S2. The films making up MR head 80 and write head 30 as shown in FIG. 2C are formed in succession on a substrate, which is an end or trailing surface 25 of air-bearing slider 22, by a series of thin film deposition, etching and lithographic patterning processes.

Figure 3:
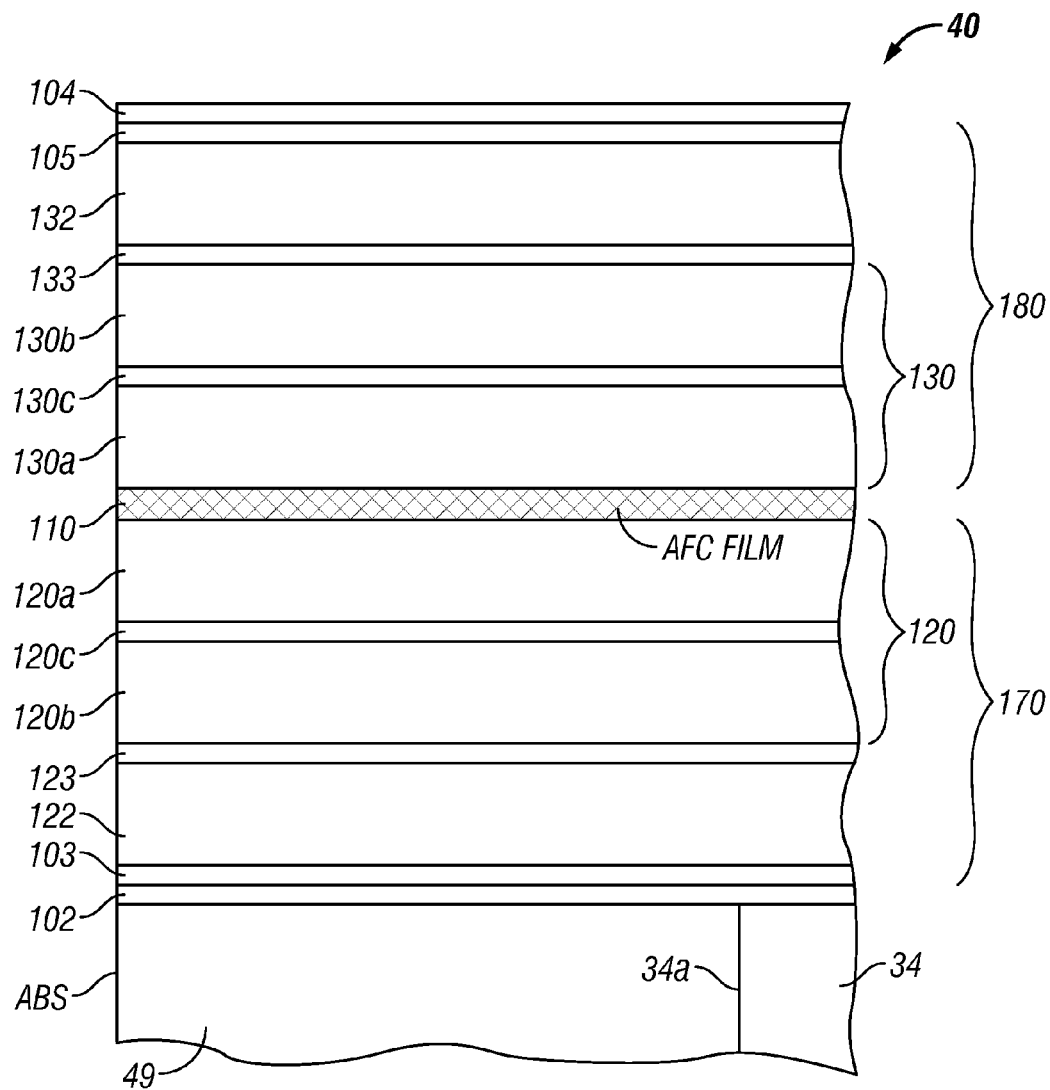
FIG. 3 is an enlarged sectional view of a prior art laminated MP.

FIG. 3 is an enlarged sectional view of a prior art laminated MP 40 which is formed over a portion of the shaped pole 34. The shaped pole 34 is typically electroplated through a photomask followed by removal of the mask, deposition of insulating non-magnetic material, like alumina ($Al_2O_3$), and planarization by chemical mechanical polishing (CMP) to form a substrate that comprises a portion of shaped pole material 34 and a portion of alumina 49. The layers of the laminated MP 40 are then sputter deposited as full films onto the so-formed substrate, a portion 49 of which is alumina and another portion of which is the material of shaped pole 34. After deposition of all the layers making up the laminated MP 40, the laminated layers are processed by a series of photo-lithographical and ion milling steps to form the MP 40 of the desired shape with flared portion 41 and a pole tip 42 (FIG.

2A). ABS lapping removes a portion of the pole tip, defining the ABS at the end of the pole tip 43. The end 34a of shaped pole 34 is recessed from the ABS. The recession is typically in the range of about 1000 to 2000 nm depending on design. An exemplary shape of a finished write head of the prior art is shown in FIG. 2A. The MP 40 includes a lower seed layer 102, such as Ru, a NiCr alloy or a NiCr/Ru bilayer, on the substrate and a bottom NiFe layer 103 on seed layer 102. The MP 40 also includes an upper capping layer 104, such as a NiCr alloy, and a top NiFe layer 105 just below the capping layer 104. The MP 40 includes an antiferromagnetically coupling (AFC) film 110 that couples two ferromagnetic layers located on the opposite sides of the AFC film 110. At least one lower ferromagnetic FeCo/NiFe/FeCo trilayer 120 is located between the seed layer 102 and the AFC film 110, and at least one upper ferromagnetic FeCo/NiFe/FeCo trilayer 130 is located between the AFC film 110 and the capping layer 104. In each trilayer 120, 130, two relatively thick high-moment FeCo layers (120a, 120b and 130a, 130b) are separated by a much thinner NiFe soft magnetic layer (120c and 130c). In FIG. 3, an additional FeCo layer 122 and intermediate NiFe layer 123 are located between the lower trilayer 120 and the bottom NiFe layer 103 on seed layer 102, and an additional FeCo layer 132 and intermediate NiFe layer 133 are located between the AFC film 110 and the top NiFe layer 105. The AFC film 110 antiferromagnetically couples the two ferromagnetic multilayers 170, and 180 (which comprise the FeCo/NiFe/FeCo trilayers 120, 130, respectively) on opposite sides of the AFC film 110 so that the moments of the two ferromagnetic multilayers are antiparallel and essentially cancel each other at zero applied magnetic field, resulting in a low remanence of the MP 40. The prior art MP 40 is described in detail in U.S. Pat. No. 7,656,611 B2, assigned to the same assignee as this application. In the '611 patent, the AFC film is chromium (Cr).

Figure 4:
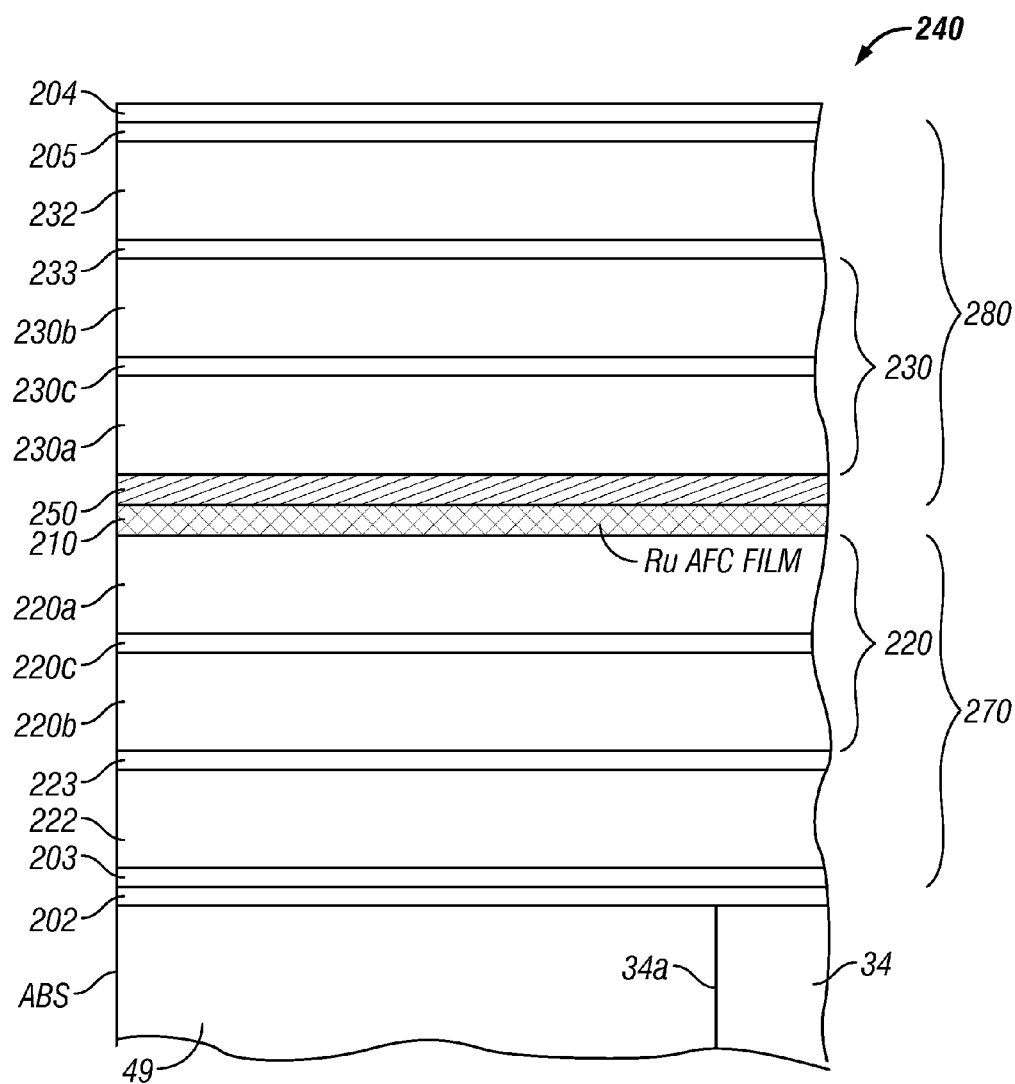
FIG. 4 is an enlarged sectional view of the laminated MP according to the invention.

This invention is an improved laminated MP. FIG. 4 is an enlarged sectional view of the laminated MP 240 according to the invention. The MP 240 is like the MP 40 of FIG. 4 but has an AFC film 210 of ruthenium (Ru) and a NiFe layer 250 above the AFC film 210 and in contact with both the AFC film 210 and the lower FeCo layer 230a of the upper FeCo/NiFe/FeCo trilayer. However, there is no NiFe layer on the bottom (the substrate side) of Ru AFC film 210. The combination of the Ru AFC film 210, the AFC-adjacent NiFe layer 250 with a specified thickness, and the absence of a NiFe film below the Ru AFC film 210 results in a MP with substantially reduced remanence and substantially increased permeability over the prior art, like the laminated MP shown in FIG. 3.

Each of the FeCo layers has a thickness in preferably in the range of 100 to 1000 Å and is a high-moment material with Fe preferably between about 40 to 80 atomic percent. Each of the NiFe layers in the two ferromagnetic FeCo/NiFe/FeCo trilayers has a thickness preferably in the range of 5 to 100 Å and is a soft magnetic material with Ni preferably between about 25 to 95 atomic percent. The Ru AFC film 210 consists essentially of Ru, i.e., it is preferably only Ru without the intentional addition of any other elements. The Ru AFC film 210 preferably has a thickness in the range of 6.5 to 9 Å. The AFC film 210 antiferromagnetically couples the two magnetic multilayers 270 (comprising the FeCo/NiFe/FeCo trilayer 220) and 280 (comprising the FeCo/NiFe/FeCo trilayer 230) on opposite sides of the AFC film 210 so that the moments of the two ferromagnetic multilayers are antiparallel and essentially cancel each other at zero applied magnetic field, resulting in a low remanence of the MP 40. The AFC-adjacent NiFe layer 250 consists essentially of only Ni and Fe with Ni in the range of 25 to 95 atomic percent. Also, it has been discovered that the AFC-adjacent NiFe layer 250 must have a thickness between 10 and 50 Å, preferably between 13 and 25 Å. If the AFC-adjacent NiFe layer 250 is too thin, less than about 10 Å, then the remanence will be unacceptably high and permeability will be unacceptably low. If the AFC-adjacent NiFe layer 250 is too thick, greater than about 50 Å, then Bs and thus permeability will be unacceptably low.

In the present invention, the thicknesses of the additional NiFe layers above the AFC film 210 (layers 230c, 233 and 205) may be reduced so that the total thickness of these NiFe layers plus the NiFe AFC-adjacent layer 250 is substantially the same (i.e., within about 10%) of the total thickness of the NiFe layers below the AFC film 210 (layers 220c, 223 and 203). Thus in one embodiment, if layers 220c, 223 and 203 are each 15 Å thick and the NiFe AFC-adjacent layer 250 is 16 Å thick, then each of the layers 230c, 233 and 205 can be made 10 Å thick. This allows the contribution to the magnetic moments from the NiFe material to be essentially balanced across the AFC film.

As part of the discovery of the present invention, the laminated structure like that shown in FIG. 3 and an identical structure, but with a 7.8 Å Ru AFC film instead of a 11.5 Å Cr AFC film, were compared for permeability and remanence. The structure with the Ru AFC film with FeCo layers in direct contact on opposite sides of the Ru AFC film exhibited 50% higher permeability than the identical structure but with the 11.5 Å Cr AFC film. However, the structure with the Ru AFC film also exhibited a substantially higher remanence, which established that Ru could not be substituted as a functional equivalent for Cr without substantially affecting the performance of the main pole.

The structure with the 7.8 Å Ru AFC film with FeCo layers in direct contact on opposite sides of the Ru AFC film was then compared with an identical structure but with a 16 Å $Ni_{80}Fe_{20}$ AFC-adjacent layer (layer 250 in FIG. 4) above the 7.8 Å Ru AFC film. This structure is like that of the present invention shown in FIG. 4 and exhibited a 30% higher permeability and a 10% smaller remanence than the comparative structure without the NiFe AFC-adjacent layer above the Ru.

To determine if further improvements in permeability and remanence could be obtained by the use of an additional AFC-adjacent NiFe layer below the AFC film, the structure of the present invention shown in FIG. 4 with a 16 Å $Ni_{80}Fe_{20}$ AFC-adjacent layer 250 above the 7.8 Å Ru AFC film 210 was compared with an identical structure but wherein the 16 Å $Ni_{80}Fe_{20}$ AFC-adjacent layer was located below the 7.8 Å Ru AFC film instead of above it. This structure exhibited an unexpectedly higher remanence (about 300% higher) than the structure of the present invention. Thus in the present invention it is critical that only a single AFC-adjacent NiFe layer be used and that it be located above the Ru AFC film.

In the present invention, as shown in FIG. 4, at least one lower ferromagnetic multilayer (FeCo/NiFe/FeCo trilayer 220) is located between the seed layer 202 and the Ru AFC film 210, and at least one upper ferromagnetic multilayer (FeCo/NiFe/FeCo trilayer 230) is located between the AFC film 210 and the capping layer 204. In each trilayer 220, 230, two relatively thick high-moment FeCo layers (220a, 220b and 230a, 230b) are separated by a much thinner NiFe soft magnetic layer (220c and 230c). However, the lower and upper ferromagnetic multilayers may contain additional FeCo layers and NiFe layers. In FIG. 4, an additional FeCo layer 222, intermediate NiFe layer 223 and bottom NiFe layer 203 are located between the lower trilayer 220 and the seed layer 202. An additional FeCo layer 232, intermediate NiFe layer 233, and top NiFe layer 205 are located between the AFC film 210 and the capping layer 204.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions of a magnetic recording layer comprising:
    a substrate; and
    a laminated main pole on the substrate and having an end for facing the recording layer, the main pole comprising:
        a first ferromagnetic multilayer comprising a first FeCo/NiFe/FeCo trilayer on the substrate;
        a second ferromagnetic multilayer comprising a second FeCo/NiFe/FeCo trilayer, the first multilayer being located between the substrate and the second multilayer;
        an antiferromagnetically coupling (AFC) film between the first and second multilayers, the AFC film consisting essentially of Ru and being located on and in contact with a FeCo layer of the first multilayer; and
        an AFC-adjacent layer of a NiFe alloy on the surface of the AFC film farther from the substrate and in contact with the AFC film, a FeCo layer of the second multilayer being located on and in contact with the AFC-adjacent NiFe layer, the AFC-adjacent NiFe layer having Ni present in an amount between 25 and 95 atomic percent and a thickness between 10 and 50 Angstroms.

2. The write head of claim 1 wherein the AFC-adjacent NiFe layer has a thickness between 13 and 25 Angstroms.

3. The write head of claim 1 wherein the Ru AFC film has a thickness between 6.5 and 9 Angstroms.

4. The write head of claim 1 wherein the laminated main pole has a remanence at least ten percent (10%) smaller than the remanence of a comparative laminated main pole having identical layers and AFC film but no AFC-adjacent NiFe layer, wherein the AFC film of the comparative laminated main pole is located between and in contact with a FeCo layer of the first multilayer and a FeCo layer of the second multilayer.

5. The write head of claim 1 wherein the laminated main pole has a permeability ($\mu$) at least thirty percent (30%) greater than the permeability of a comparative laminated main pole having identical layers and AFC film but no AFC-adjacent NiFe layer, wherein the AFC film of the comparative laminated main pole is located between and in contact with a FeCo layer of the first multilayer and a FeCo layer of the second multilayer.

6. The write head of claim 1 further comprising a seed layer between the substrate and the first trilayer.

7. The write head of claim 6 wherein the seed layer is selected from Ru, a NiCr alloy and a NiCr/Ru bilayer.

8. The write head of claim 6 wherein the first multilayer comprises a FeCo/NiFe/FeCo/NiFe/FeCo multilayer between the seed layer and the AFC film.

9. The write head of claim 1 further comprising a capping layer on the second trilayer.

10. The write head of claim 9 wherein the capping layer consists essentially of a NiCr alloy.

11. The write head of claim 9 wherein the second multilayer comprises a FeCo/NiFe/FeCo/NiFe/FeCo multilayer between the AFC film and the capping layer.

12. The write head of claim 1 wherein each of the NiFe layers in the first and second trilayers has Ni present in an amount between 25 and 95 atomic percent, and each of the FeCo layers in the first and second trilayers has Fe present in an amount between 40 and 80 atomic percent.

13. The write head of claim 1 wherein each of the NiFe layers in the first and second trilayers has a thickness between 5 and 100 Angstroms, and each of the CoFe layers in the first and second trilayers has a thickness between 100 and 1000 Angstroms.

14. The write head of claim 1 wherein the total thickness of all NiFe layers between the substrate and the AFC film is greater than 90 percent and less than 110 percent of the total thickness of all NiFe layers above the AFC film.

15. The write head of claim 1 further comprising a shaped pole, wherein the shaped pole is the substrate, the shaped pole having an end recessed from the main pole end.

16. The write head of claim 1 further comprising an electrically conductive coil for generating magnetic flux in the main pole.

17. A magnetic recording disk drive comprising:
    a rotatable magnetic recording disk comprising a substrate, an underlayer on the substrate, and a perpendicular recording layer on the underlayer; and
    the write head of claim 1.

18. A perpendicular magnetic recording write head for magnetizing regions of a magnetic recording layer comprising:
    a shaped pole; and
    a laminated main pole on the shaped pole and having an end for facing the recording layer, the main pole comprising:
        a first FeCo/NiFe/FeCo trilayer on the shaped pole;
        an antiferromagnetically coupling (AFC) film consisting essentially of Ru on the first trilayer, the AFC film being located on and in contact with the first trilayer FeCo layer farthest from the shaped pole, the AFC film having a thickness between 6.5 and 9 Angstroms;
        an AFC-adjacent layer of a NiFe alloy on and in contact with the surface of the AFC film farther from the shaped pole, the AFC-adjacent NiFe layer having Ni present in an amount between 25 and 95 atomic percent and a thickness between 13 and 25 Angstroms; and
        a second FeCo/NiFe/FeCo trilayer on the AFC-adjacent NiFe layer, the second trilayer FeCo layer closest to the AFC film being located on and in contact with the AFC-adjacent NiFe layer.

19. The write head of claim 18 further comprising a seed layer between the shaped pole and the first trilayer.

20. The write head of claim 18 further comprising a capping layer on the second trilayer.

* * * * *